United States Patent [19]
Bodine

[11] Patent Number: 4,779,237
[45] Date of Patent: Oct. 18, 1988

[54] METHOD OF GEOPHYSICAL EXPLORATION INCLUDING PROCESSING AND DISPLAYING SEISMIC DATA TO OBTAIN A MEASURE OF SUBTERRANEAN FORMATION ROCK PROPERTIES

[75] Inventor: John H. Bodine, Tulsa, Okla.

[73] Assignee: Amoco Corporation, Chicago, Ill.

[21] Appl. No.: 645,121

[22] Filed: Aug. 27, 1984

[51] Int. Cl.⁴ ............................................. G01V 1/34
[52] U.S. Cl. ...................................... 367/47; 367/63; 367/73; 364/421
[58] Field of Search ....................... 367/21, 47, 61–63, 367/73; 364/421

[56] References Cited

U.S. PATENT DOCUMENTS

| | | | |
|---|---|---|---|
| 4,136,754 | 1/1979 | Manin | 367/20 |
| 4,170,002 | 10/1979 | Strange | 367/23 |
| 4,415,999 | 11/1983 | Maechel et al. | 367/33 |
| 4,437,176 | 3/1984 | Mack | 367/56 |
| 4,534,019 | 8/1985 | Wiggins et al. | 367/56 |
| 4,573,148 | 2/1986 | Herbenhoff et al. | 367/47 |

OTHER PUBLICATIONS

Schneider et al, "General Implications . . . Waves", 1984, pp. 672, Geophysics, vol. 49, #5; 9/15/83 at 53rd SEG Mtg at Las Vegas.
White, R. E., "Partial Coherence . . . Seismic Traces", 1980, pp. 333–335, Geophysical Prospecting, vol. 28.

Primary Examiner—Nelson Moskowitz
Attorney, Agent, or Firm—Timothy D. Stanley

[57] ABSTRACT

The present invention provides a method of seismic exploration for obtaining a measure of the subterranean formation rock properties. Incident angle ordered gathers of seismic signal are processed to obtain a measure of the reflection coefficient as well as attributes descriptive of variations in amplitude of the seismic signal as a function of incident angle. Such attributes, when plotted on an angle dependent amplitude diagram, are transformed into a most probable estimate of the subterranean formation rock properties as well as a diagnostic of relative lithology and pore fluid contrast.

26 Claims, 15 Drawing Sheets

FIELD DATA

METHOD OF GEOPHYSICAL EXPLORATION INCLUDING PROCESSING AND DISPLAYING SEISMIC DATA TO OBTAIN A MEASURE OF SUBTERRANEAN FORMATION ROCK PROPERTIES

BACKGROUND OF THE INVENTION

The present invention relates generally to a method of geophysical exploration including processing and displaying seismic data to obtain a measure of subterranean formation rock properties. Seismic data including a plurality of seismic signals or traces are obtained with sets of seismic sources and seismic receivers. A set of observed attributes, quantitatively descriptive of variations in the seismic signal amplitude as a function of incident angle, are obtained for selected seismic events. The observed set of attributes provides a measure of the contrast in formation rock properties across subterranean formation interfaces associated with each selected seismic event. The set of observed attributes can be transformed to provide a most probable estimate of the subterranean formation rock properties. Additionally, a diagnotic technique is provided for interpreting relative formation lithology and pore fluid content.

In the continuing search for hydrocarbons contained in the earth's subterranean formations, exploration geophysicists have developed numerous techniques for imparting seismic wave energy into the earth's subterranean formations; recording the returning reflected seismic wave energy and processing the recorded seismic wave energy to produce seismic signals or traces. Such seismic signals or traces contain a multiplicity of information, e.g., frequency, amplitude, phase, etc., which can be related to formation structure, lithology, or pore fluid content. More recently, geophysicists' interest have turned to evaluating high intensity seismic amplitude events in the seismic signals or traces, i.e., "bright spots" and variations in the seismic signal amplitude as a function of range for selected seismic events. Exemplary of such focus are Quay, et. al., U.S. Pat. No. 3,899,768; Thompson, et. al., U.S. Pat. No. 4,375,090, and Ostrander, U.S. Pat. Nos. 4,316,267 and 4,316,268.

In particular, Ostrander indicates that progressive changes in the seismic signal amplitude of a high intensity seismic event, as a function of range, is more likely than not an indicator of a gas-bearing formation. Specifically, progressive seismic signal amplitude changes, in an increasing or decreasing manner, with increasing range is the criteria for identifying gas-bearing formations. Ostrander discloses a method for signal enhancement to improve the visual resolution of such progressive changes in seismic signal amplitude as a function of range.

Quay recognizes that lateral variations in the seismic data can be attributed to variations of the lithological character of the subterranean formations. Quay obtained such results by extracting selected seismic parameters from a seismic wave and thereafter displaying such seismic parameters upon a seismic trace of such seismic data. The visual correlation of events in such seismic parameters relative to the structural interpretation of the seismic trace yielded a scheme for interpreting seismic record sections.

Thompson discloses that acoustic characteristics associated with hydrocarbon-containing formations can be compared with similar synthetic values.

Although evaluation of bright spots has been used to indicate gas reservoirs throughout the world, such analysis is still a calculated risk, as evidenced by the significant number of such events which are nonproductive when actually drilled.

SUMMARY OF THE INVENTION

In accordance with the present invention, a novel method of geophysical exploration is disclosed including processing and displaying seismic data to obtain a measure of subterranean formation rock properties. Unlike prior qualitative attempts to utilize variations in the amplitude of a seismic signal or trace, the present invention provides the seismologist with a quantitative method for interpreting variations in the amplitude of the seismic signal or trace, so as to determine a most probable estimate of formation rock properties as well as pore fluid content and lithology.

Seismic data including a plurality of seismic signals are obtained from sets of seismic sources and seismic receivers. A first set of attributes descriptive of variations in the seismic signal amplitude as a function of incident angle for selected seismic events are obtained. The first set of attributes are transformed into a measure of the subterranean formation rock properties associated with each selected seismic event.

For each selected seismic event, a first measure of reflection coefficient is obtained from variations in the seismic signal or trace amplitude as a function of incident angle. By assuming a set of the most probable rock properties for an overlying formation associated with the selected seismic event of interest and by allowing the underlying formation to have any other set of rock properties, a second measure of reflection coefficient associated with the selected seismic event can be calculated from the contrast in rock properties across such formation interface as well as a second set of attributes.

An angle dependent amplitude diagram can be formed comprising a lithology diagram having contour representations of the second set of attributes mapped thereon. The first set of attributes are scaled with an inversion scalar from units of seismic signal amplitude to units of reflection coefficient. Plotting the scaled first set of attributes on the contour mappings of the second set of attributes of the angle dependent amplitude diagram transforms the quantitative measure of the incident angle dependent seismic signal amplitude into a most probable estimate of rock properties of the underlying formation.

DESCRIPTION OF THE PREFERRED EMBODIMENT OF THE INVENTION

Figure 1:
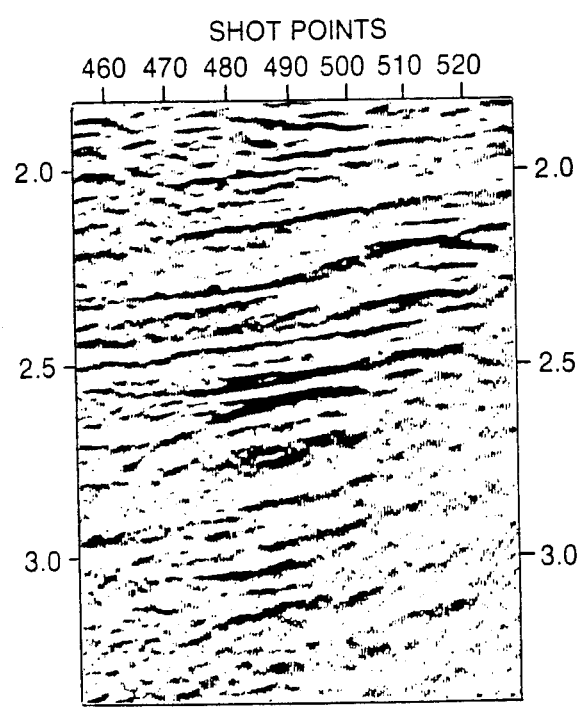
FIG. 1 is a common depth point stack of field seismic data.

Prior to the discussion of the preferred embodiment of the present invention, a brief description of the fundamental concepts underlying the discovery may prove beneficial and are presented herewith.

Seismic prospecting has employed the concept of imparting seismic wave energy into the surface of the earth whereby the resulting seismic waves propagate downwardly into the earth and are partially reflected back towards the surface when compressional impedance changes within the earth are encountered. A change from one formation type to another, if accompanied by a change in compressional impedance, can provide a measure of the reflection coefficient $R_c(\theta)$ for normal incidence ($\theta=0°$) of the seismic wave upon a formation interface. The normal incident reflection coefficient $R_c(0°)$ depends upon both the compressional velocity and density changes between the two adjacent formations according to the formula:

$$R_c(0°) = A_r/A_i = \frac{\alpha_2\rho_2 - \alpha_1\rho_1}{\alpha_2\rho_2 + \alpha_1\rho_1} \quad (1)$$

where $A_r$ is the amplitude from the reflected seismic signal and $A_i$ is the amplitude of the normally incident seismic signal; $\alpha_1$ is the compressional velocity of the seismic wave in the overlying formation $F_1$; $\alpha_2$ is the compressional velocity of the acoustic wave in formation $F_2$ below the interface; $\rho_1$ is the density of the overlying formation $F_1$ and $\rho_2$ is the density of the underlying formation $F_2$.

The reflection coefficient $R_c(\theta)$ for non-normal incidence depends upon the shear wave velocities in the adjacent formations as well as the compressional velocities and densities of both formations. A theoretical reflection coefficient $R_c(\theta)$ can be calculated for an assumed contrast in formation rock properties using the exact plane wave solution as shown by K. Aki and R. G. Richards ("Quantitative Seismology Theory and Method", Freeman and Company, San Francisco, 1980, pages 144–151) and incorporated by reference herein. An approximation to the exact plane wave solution for the theoretical reflection coefficient $R_c(\theta)$ for any angle of incidence $\theta$ can be obtained using the following:

$$R_c(\theta) = B_0 + B_1 \tan^2\theta + B_2 \tan^2\theta \sin^2\theta \quad (2)$$

Attributes $B_0$, $B_1$ and $B_2$ provide quantitative measure of the variations in the seismic signal amplitude as a function of incident angle. Those skilled in the art recognize that the attribute $B_0$ has substantially the same value as shown in Equation (1) for the normally incident reflection coefficient $R_c(0°)$. The attribute $B_0$ is strictly related to the compressional impedance change across a formation interface. The attributes $B_1$ and $B_2$ are related to both changes in compressional wave velocity and shear wave velocity. Moreover, the attribute $B_1$ is related to the mid-range slope or rate of change of the seismic signal amplitude, while attribute $B_2$ is related to large incident angle amplitude changes.

Equation (2) can also be employed to provide a measure of an observed reflection coefficient $R_c'(\theta)$ obtained from incident angle dependent variations in the seismic signal amplitude for a selected seismic event in an incident angle ordered gather of field seismic signals. Thus, Equation (2) provides means for relating the assumed contrast in formation rock properties to the incident angle dependent variations in the seismic signal amplitude so as to obtain a most probable estimate of the formation rock properties as well as lithology and pore fluid content. Equation (2) is merely by way of example since other parametric equations can be developed having a new set of attributes related to different formation properties. ties.

Since a selected seismic event in an incident angle ordered gather of field seismic signals is associated with an incident angle $\theta$, a least squares solution of Equation (2) can provide a measure of the observed reflection coefficient $R_c'(\theta)$ and the observed attributes $B_0'$, $B_1'$, and $B_2'$.

The dip and depth of a given subterranean formation, the interval velocities as a function of depth, and the largest offset in the seismic acquisition system determine the maximum incident angle $\theta$ or aperture for the reflected seismic signals. If the incident angle $\theta$ is generally constrained to angles approximately no more than 35°, the attribute $B_2$ can be disregarded.

EXAMPLE 1

Figure 2:
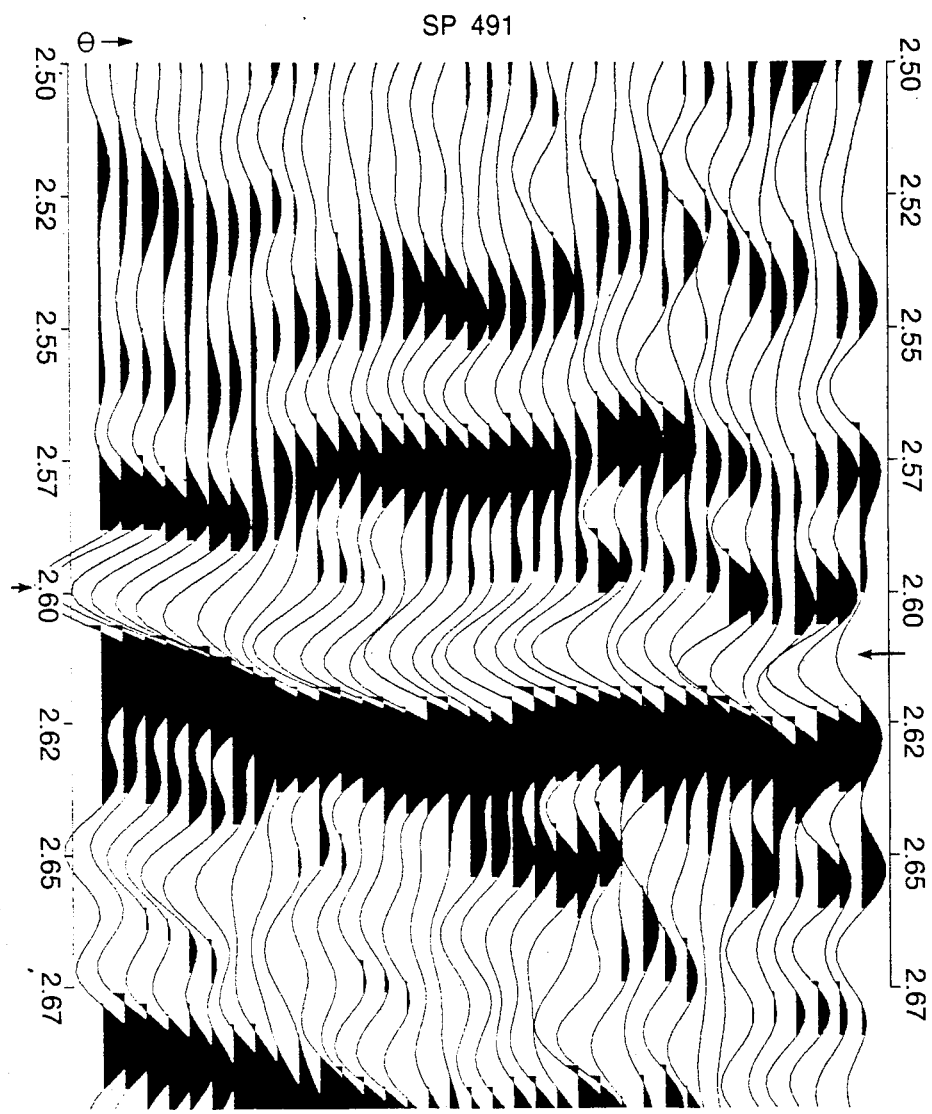
FIG. 2 is a common depth point gather of the field seismic traces at SP 491 within a time selected time window.

Looking first to FIG. 1, a common depth point (CDP) seismic section of seismic data is shown. A time window of a CDP gather of unstacked field seismic signals or traces about SP491 of FIG. 1 are shown in FIG. 2. Particular attention is drawn to the seismic event at approximately 2.6 sec. of FIG. 2 and indicated with arrows thereon.

Using Equation (2) and disregarding the $B_2$ term, a least-squares fit can be made to the incident angle dependent variations in the seismic signal amplitude for the seismic event indicated at time 2.6 sec of FIG. 2 to obtain a measure of the observed reflection coefficient $R_c'(\theta)$ as well as observed attributes $B_0'$ and $B_1'$. To do so, the field seismic signal or trace amplitudes corresponding to the seismic event, indicated by the arrows in FIG. 2, are first measured across the CDP gather of unstacked field seismic signals and then the amplitude for each field seismic signal is represented as a function of incident angle in FIG. 3.

Specifically, as shown in the field seismic signal or trace amplitudes for the selected seismic event in FIG. 2 are measured to obtain values of the amplitude of the field seismic signals as a function of incident angle. The measured values of the field seismic signal or trace amplitude are represented on FIG. 3 as indicated by the curve 10. A least-squares fit approximation to curve 10 using Equation (2) is represented by curve 20. Curve 20 thus provides a statistically optimized fit of the incident angle-dependent variations in the amplitude of the field seismic signals for the selected seismic event as well as a measure of the observed reflection $R_c'(0)$. Additionally, the values obtained coefficient from Equation (2) for the observed attributes $B_0'$ and $B_1'$ are shown on FIG. 3. Since the maximum incident angle $\theta$ was restrained to less than 32°, the attribute $B_2$ can be disregarded.

LITHOLOGY DIAGRAM

Figure 4:
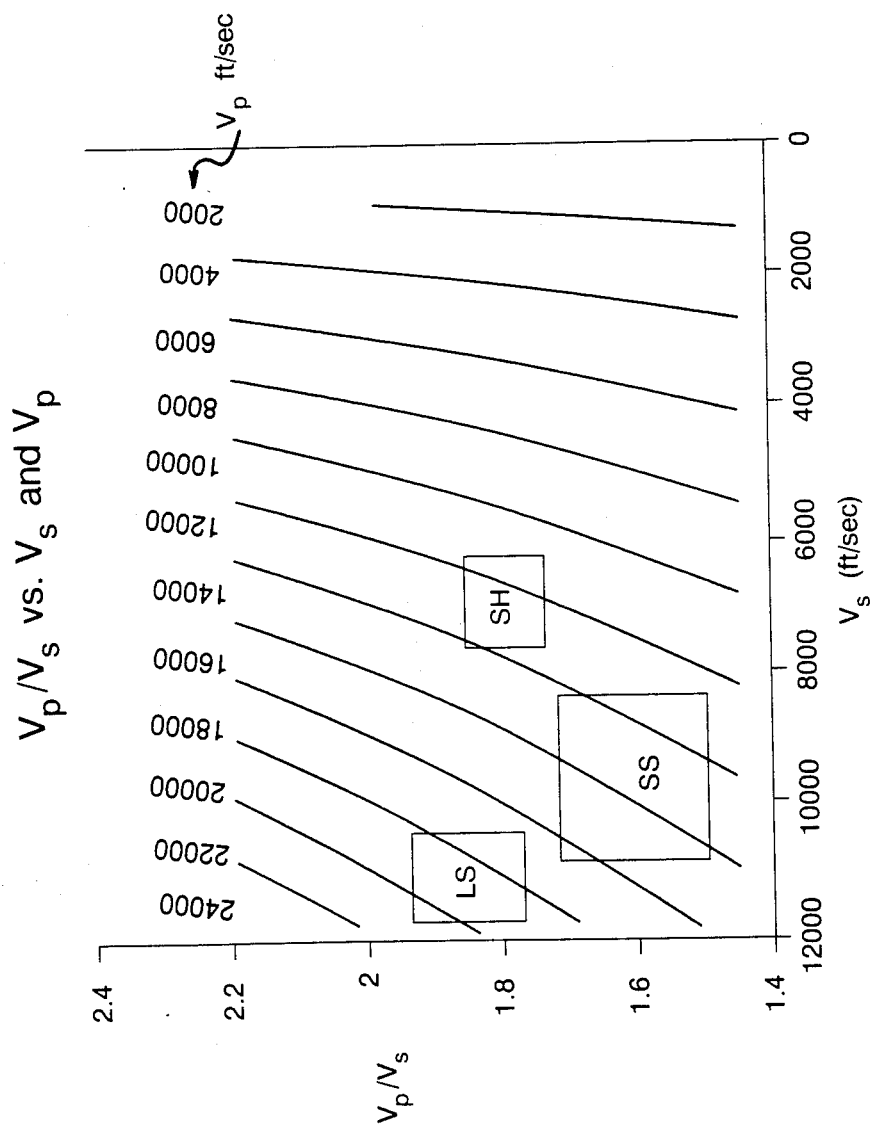
FIG. 4 is a generalized lithology diagram demonstrating the general relationship between formation lithology and the formation properties $V_p$ and $V_s$.

Looking now to FIG. 4, a lithological diagram is shown having axes of the ratio of compressional wave velocity to shear wave velocity ($V_p/V_s$) and shear wave velocity ($V_s$). The lithological outlined in FIG. 4, i.e., LS, SS, and SH, indicate that lithology has a general relationship to the ratio of compressional wave velocity to shear wave velocity ($V_p/V_s$) and shear wave velocity ($V_s$). Lithology diagrams similar to FIG. 4 have been proposed by others which map out somewhat different regions for the same lithologies. And, in fact, although the lithology diagram shown in FIG. 4 has axes of selected formation rock properties, those skilled in the art recognize that other formation rock properties can be used as axes, e.g., Poissons ratio versus $V_p$. The present choice of axes is merely by way of example. Regardless of the axes chosen, those skilled in the art agree that such lithology diagrams demonstrate that a general relationship exists between formation lithology and formation properties (e.g., $V_p$ and $V_s$) even though no precise correlation has been established between formation lithology and these formation properties. It is sufficient that such lithology diagrams recognize a general correlation between relative changes in formation lithology and formation properties.

Specifically, in FIG. 4, it has been generally found that block LS can represent limestone formations, block SS can represent sandstone formations, and block SH can represent shale formations. The lithology diagram can also include constant compressional velocity $V_p$ contours. As we shall see, the lithology diagram of FIG. 4, albeit without the lithology blocks represented thereon, can be used to transform the observed attributes, $B_0'$, $B_1'$, and $B_2'$, descriptive of incident angle-dependent seismic signal amplitude variations, into a most probable estimate of formation rock properties.

An important seismic formation rock property not represented on the lithology diagram of FIG. 4 is density. However, one can implicitly include formation density $\rho$ by use of the following dependent relation:

$$\rho = a(V_p)0.25 \quad (3)$$

where "a" is approximately equal to 0.23. Therefore, any point on the lithology diagram in FIG. 4 can represent the rock properties $V_p$, $V_s$ and the density as a function of compressional velocity $\rho(V_p)$ for a given formation. Pairs of points on FIG. 4 can be considered to represent a contrast in formation rock properties between adjacent subterranean formations for which a theoretical reflection coefficient $R_c(\theta)$ can be calculated as well as theoretical attributes $B_0$, $B_1$ and $B_2$ associated therewith.

THEORETICAL ATTRIBUTES

Figure 5:
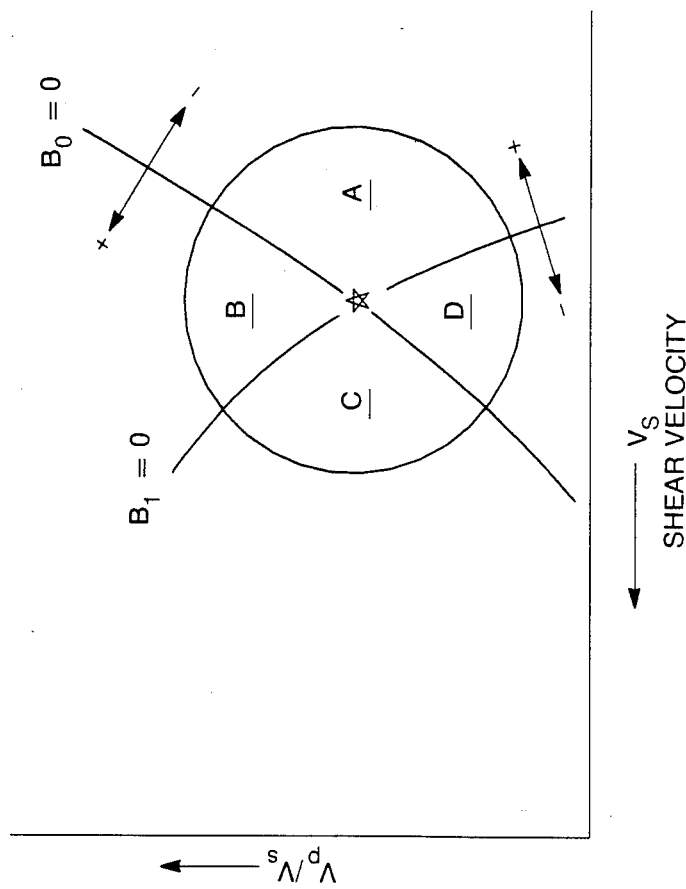
FIG. 5 is a lithology diagram demonstrating the transformation of attributes descriptive of variations in the amplitude of the seismic signal as function of incident angle into formation properties.
Figure 6:
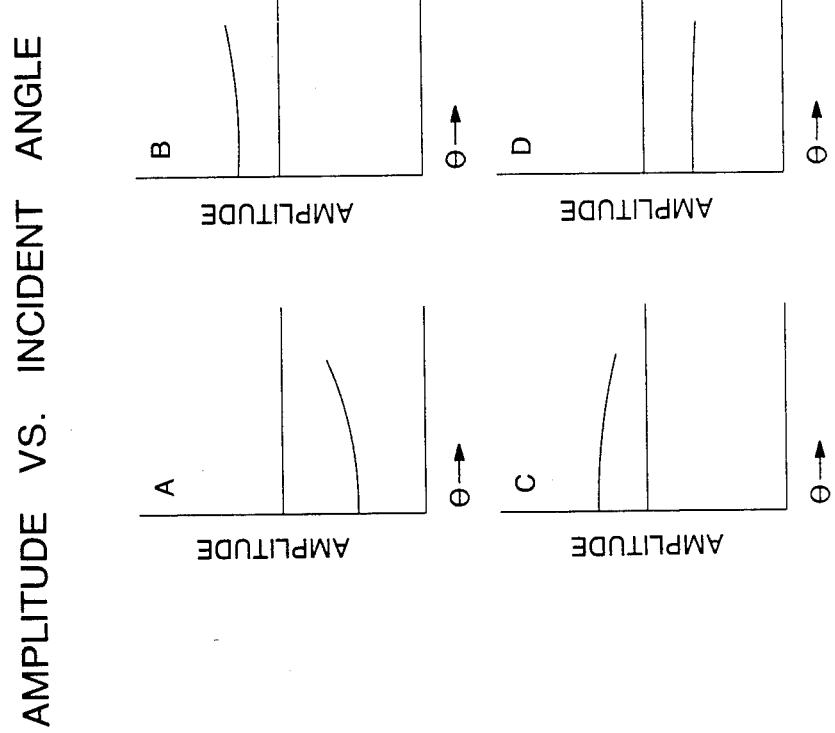
FIGS. 6a–d are representative diagrams of the variation of the reflection coefficient as an angular function of range for sectors of $B_0$ and $B_1$ values.

Assuming that the elastic formation rock properties ($V_p$, $V_s$ and $\rho$ ($V_p$)) are generally known or reasonable estimates can be made for an overlying formation $F_1$ associated with a selected seismic event, such properties can be represented by a star on a lithology diagram as in FIG. 5. Allowing the adjacent underlying reservoir formation $F_2$ associated with the selected seismic event to have any other set of elastic rock properties, within a radius of potential formation rock properties about the star, each pair of potential underlying reservoir formation $F_2$ rock properties and assumed overlying roof formation $F_1$ rock properties defines an elastic interface having a specific contrast in rock properties for which the theoretical reflection coefficient $R_c(\theta)$ can be obtained.

Selected pairs of underlying formation $F_2$ and overlying formation $F_1$ rock properties can be employed to calculate the exact elastic plane wave reflection coefficients $R_c(\theta)$ as described by Aki and Richards in "Quantitative Seismology Theory and Method," supra pages 144–151 incorporated herein by reference. A statistically optimized fit of Equation (2) to the resulting exact solution of the theoretical reflection coefficient $R_c(\theta)$ can be employed to obtain estimates of the theoretical attributes $B_0$, $B_1$, and $B_2$. In the preferred embodiment the statistically optimized fit is obtained by employing a leastsquares fit of Equation (2) to the exact solution the theoretical reflection coefficient $R_c(\theta)$. Those skilled in the art recognize that other statistical techniques can be employed.

In fact, the zero values for the theoretical attributes $B_0$, and $B_1$, can define quadrants as represented in FIG. 5, corresponding to selected contrasts in formation rock properties. The exact plane wave solutions for the theoretical reflection coefficient $R_c(\theta)$ represented in FIGS. 6a–d correspond to selected contrasts in formation rock properties wherein the selected underlying formations $F_2$ rock properties fall within the respective sectors A, B, C, and D of FIG. 5. Each sector of FIG. 5 thus defines a different combination of values for theoretical attributes $B_0$ and $B_1$. As shown in Table 1 below, it can be seen that the theoretical attributes $B_0$ and $B_1$ have the same sign in sectors B and D and opposite signs in sectors A and C.

TABLE 1

| Sector | $B_0$ | $B_1$ |
|---|---|---|
| A | − | + |
| B | + | + |
| C | + | − |
| D | − | − |

In this case, the theoretical reflection coefficient $R_c(\theta)$ and the associated theoretical attributes $B_0$ and $B_1$ were obtained by assuming an aperture or maximum incident angle $\theta$ of approximately 30°. The assumed set of rock properties for the overlying formation $F_1$ are indicated by the star in FIG. 5. Thus, pairs of points on the lithology diagram of FIG. 5 can be associated with sets of theoretical attributes $B_0$ and $B_1$ which can encompass a complete spectrum of potential rock properties for the underlying formation $F_2$.

Figure 7:
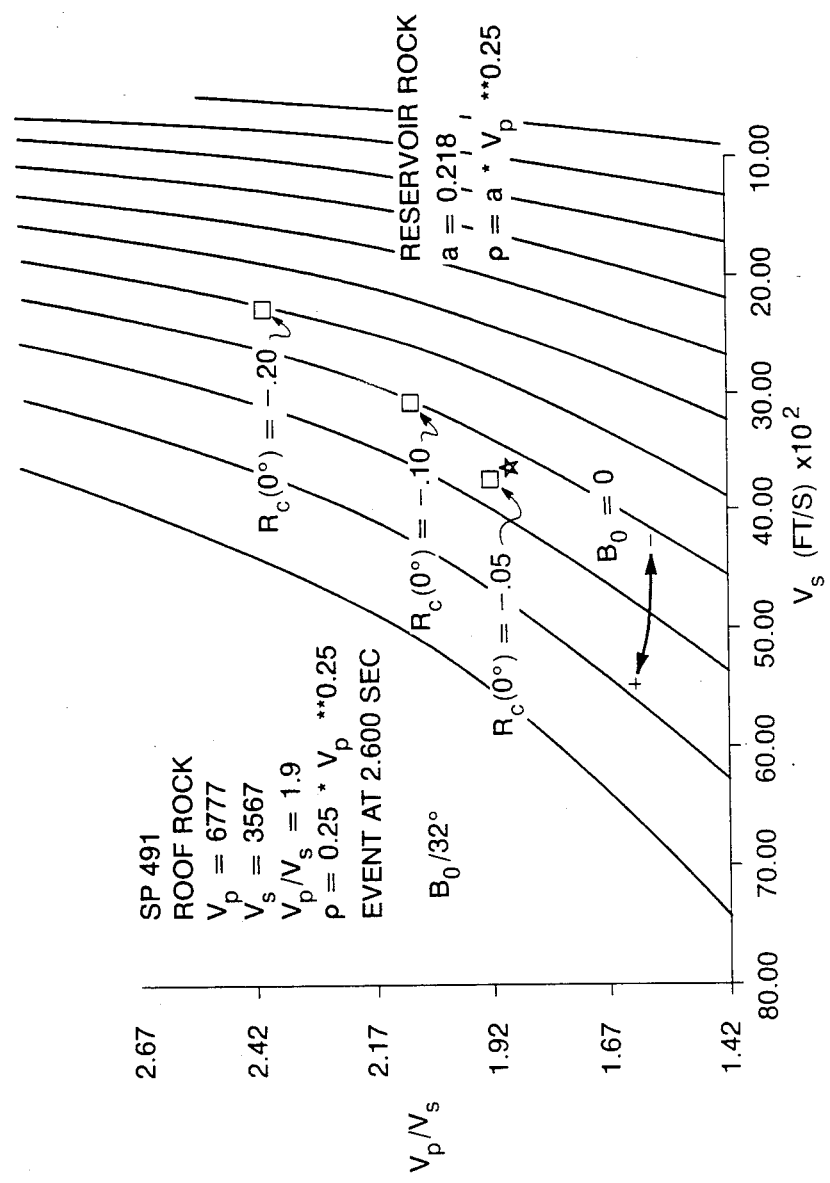
FIG. 7 is an angle dependent amplitude diagram having contour plots of the theoretical attribute $B_0$ values on a lithology diagram.
Figure 8:
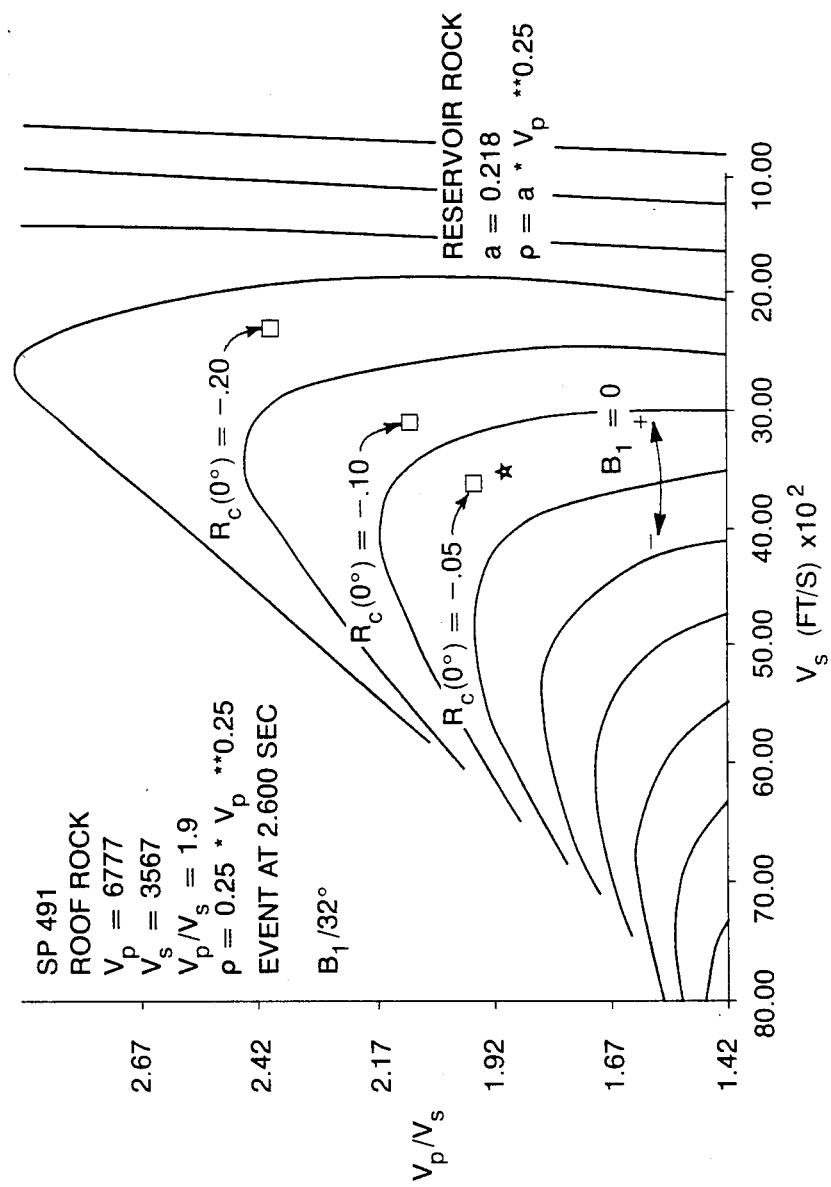
FIG. 8 is an angle dependent amplitude diagram having contour plots of the theoretical attribute $B_1$ values on a lithology diagram.

The lithology diagram of FIG. 5 can be supplemented to include sets of contour lines of the theoretical attributes $B_0$ and $B_1$, as shown separately in FIGS. 7 and 8, respectively. Hereafter, lithology diagrams having sets of theoretical attributes $B_0$ and $B_1$ contour lines mapped thereon are designated angle dependent amplitude (ADA) diagrams.

OBSERVED ATTRIBUTES

As a first step in relating the theoretical attributes $B_0$ and $B_1$ to the actual seismic data acquired, it is necessary to analyze unstacked CDp gathers of the field seismic signals to ascertain true variations in the amplitude of the field seismic signal with incident angle for a selected seismic event. Although unstacked CDP gathers of field seismic signals or traces have been employed, such is merely exemplary since it is understood that other methods can be used for sorting field seismic signals or traces into gathers of ordered incident angle (either increasing or decreasing).

Preprocessing of the field seismic signals includes correcting for true relative amplitude recovery; correcting for normal moveout; correcting for surface and residual statics; balancing the frequency content from near range to far range; and bandpassing for optimum signal-to-noise ratio. Thereafter, selected seismic events can be aligned across unstacked CDP gathers of the field seismic signals and the amplitudes measured so as to obtain a least-squares fit to Equation (2) to obtain a measure of the observed reflection coefficient $R_c'(\theta)$ and the observed attributes $B_0'$ and $B_1'$.

Recall that the attribute $B_0$ is a measure of the normal incident reflection coefficient $R_c'(0°)$, and the attribute $B_1$ is a measure of the midrange slope or rate of variation of the seismic signal amplitude. The attribute $B_2$ is generally not used because of its sensitivity to noise, an effect that can be avoided by limiting the maximum incidence angle or aperture to approximately 35° for which the attribute $B_2$ is not significant. After values for the observed attributes $B_0'$ and $B_1'$ are obtained from the seismic data, it is necessary to relate the observed attributes $B_0'$ and $B'$ to the theoretical attributes $B_0$ and $B_1$.

A seismic scalar K is employed by the seismologist to invert the observed attributes $B_0'$ and $B_1'$ from units of seismic signal amplitude into units of reflection coefficient. The seismic scalar K is generally related to the seismic data acquisition parameters and certain of the preprocessing steps as empirically determined by the seismologists.

TRANSFORMATION OF ATTRIBUTES

In order to relate the observed attributes $B_0'$ and $B_1'$ to the theoretical attributes $B_0$ and $B_1$, it is necessary to find an appropriate seismic scalar K to invert seismic amplitude into units of reflection coefficient. This scalar K is generally unknown. Approximations can be made that bracket a reasonable range of values. When the observed attributes $B_0'$ and $B_1'$ are scaled to reflection coefficient units, the new scaled observed attributes $\overline{B}_0$ and $\overline{B}_1$ can be plotted on the theoretical attributes $B_0$ and $B_1$ contour lines of the ADA diagrams in FIGS. 7 and 8. The point of intersection of the corresponding attribute contour lines associated with the scaled observed attributes $\overline{B}_0$ and $\overline{B}_1$ provides a most probable estimate of the underlying reservoir formation $F_2$ rock properties ($V_s$, $V_p$, $\rho$ ($V_p$))

Figure 9:
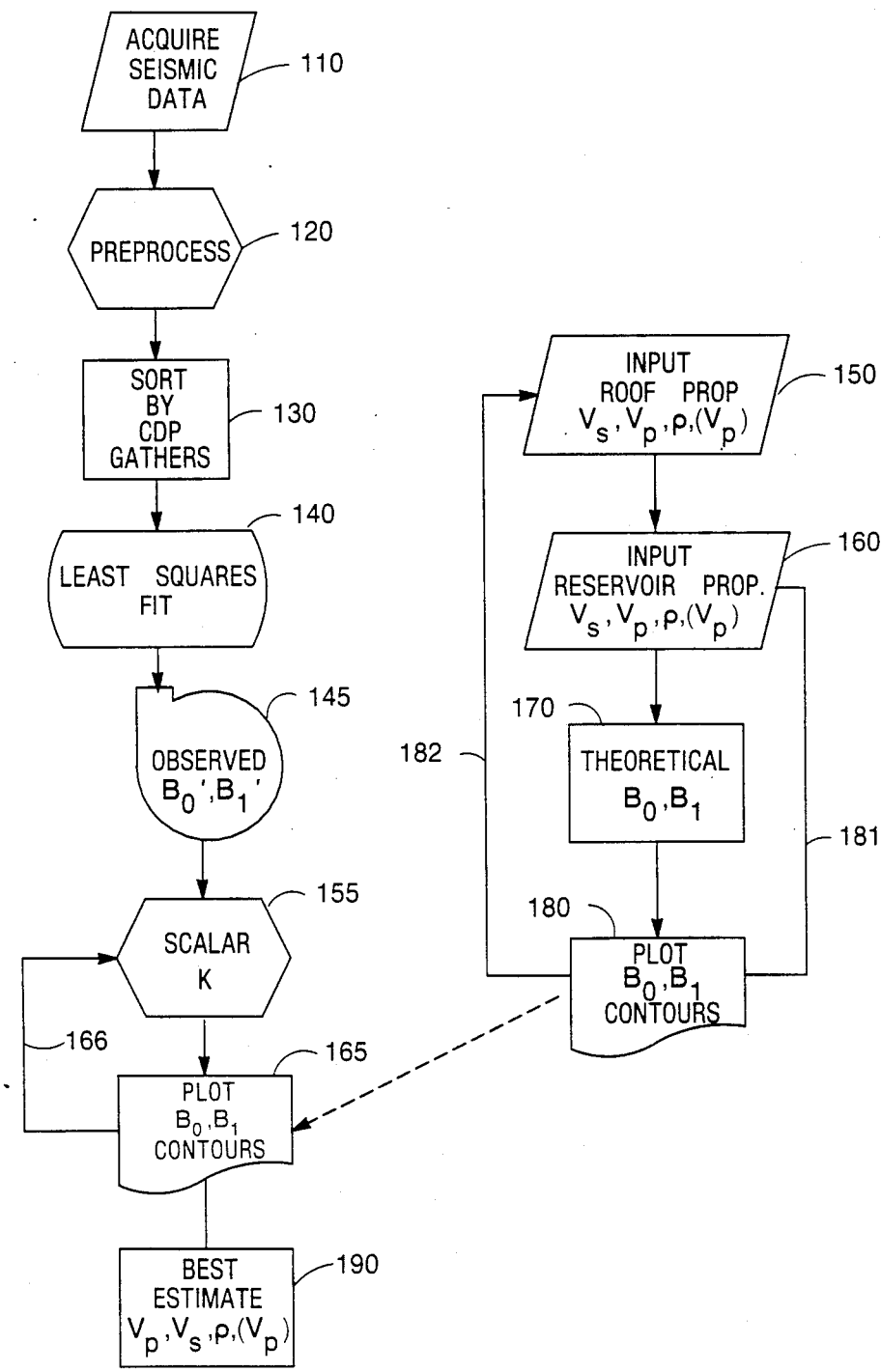
FIG. 9 is a process flow diagram of the present invention.

Looking at FIG. 9, which is a process flow diagram, it can be seen that seismic data is first acquired in block 110. Thereafter, such seismic data is preprocessed to enhance the true seismic signal amplitude variations with range, as indicated in block 120. It is also necessary to enhance the signal-to-noise ratio of the seismic signal since the observed attributes, $B_0'$, $B_1'$ and $B_2'$ must provide a measure of incident angle-dependent variations in the amplitude of the seismic signal or trace and not noise. In block 130, the preprocessed field seismograms are sorted into gathers of ordered incident angle (either increasing or decreasing) such as the unstacked common depth point gathers of the field seismic signals or traces shown in FIG. 2. As a result of the least-squares fit of the field seismic signal or trace amplitudes as a function of incident angle to Equation (2) for a selected seismic event, values of the observed attributes $B_0'$ and $B_1'$ are determined as well as an approximation of the observed reflection coefficient $R_c'(\theta)$, all of which are stored in block 145.

Concurrently, the seismologist inputs the most likely overlying formation rock properties for the overlying roof formation $F_1$ associated with the seismic event, e.g., $V_s$, $V_p$ and $\rho$ ($V_p$), in block 150. This information is generally known with some precision for the roof formation $F_1$. As we shall see later, small variations within this assumption do not significantly alter the end result. For the underlying formation $F_2$, a plurality of possible values of shear wave velocity $V_s$ and compressional wave velocity $V_p$ are assumed for a fixed density $\rho$, as shown in block 160.

In Block 170, a solution to exact elastic plane wave theoretical reflection coefficient $R_c(\theta)$ can be obtained using pairs of the formation $F_1$ rock properties and the formation $F_2$ rock properties associated with the selected seismic event. A least-squares fit of Equation (2) thereto provides a set of theoretical attributes $B_0$ and $B_1$.

It is germane at this point to note that Equation (2) has been used to relate (1) the exact elastic solutions of the theoretical reflection coefficient $R_c(\theta)$ derived from pairs of adjacent formation rock properties (2) to the observed amplitude variations in the seismic data with incident angle. This is accomplished by obtaining statistically optimized fits of Equation (2) for both the theoretical and observed reflection coefficients and thereafter relating their respective attributes.

Contour mappings of a plurality of sets of theoretical attributes $B_0$ and $B_1$ on lithology diagrams can be made to produce ADA diagrams in Block 180, such as shown separately in FIGS. 7 and 8, respectively. This sequence can be reiterated, as shown by line 181, by returning to block 160, to recalculate the theoretical attributes $B_0$ and $B_1$, for different assumed formation $F_2$ density $\rho$ according to Equation (3) by changing the value of "a". Moreover, by line 182 returning to block 150, it is possible to assume different values of compressional wave velocity $V_p$ and shear wave velocity $V_s$ for the formation $F_1$ rock properties and thereafter produce additional sets of the theoretical attributes $B_0$ and $B_1$ contour lines.

Those skilled in the art will recognize that in a computer implemented system, ADA diagrams comprising lithology diagrams having contour mappings of the theoretical attributes $B_0$ and $B_1$ represented thereon for a broad range of contrasting formation $F_1$ and $F_2$ rock properties need not actually be obtained as indicated in Block 180. Rather, such ADA diagram having contour mappings of the theoretical attributes $B_0$ and $B_1$ can be stored within a memory retrievable on demand.

Returning now to Block 140 of FIG. 9, recall that the observed attributes $B_0'$ and $B_1'$, in units of seismic amplitude, were determined for selected seismic events using a least squares fit of Equation (2) to a CDP gather of unstacked field seismic signals for a selected seismic event and stored in Block 145. In order to relate the observed attributes $B_0'$ and $B_1'$ to the theoretical attributes $B_0$ and $B_1$, it is necessary to apply an appropriate inversion scalar K to invert the observed attributes $B_0'$ and $B_1'$, which are in units of seismic signal amplitude, into reflection coefficient units of the theoretical attributes $B_0$ and $B_1$.

The scaler K used will be described in units of the reflection coefficient $R_c(\theta)$ it produces. This scalar K is generally unknown. However, the reasonableness of the range of values assumed can be evaluated in terms of the size of the reflection coefficient $R_c(\theta)$ produced in light of the actual seismic signal amplitudes. When a selected scalar K is applied in block 155, the observed attributes $B_0'$ and $B_1$40 are inverted to have units commensurate with the theoretical attributes $B_0$ and $B_1$. The scaled observed attributes $\overline{B}_0$ and $\overline{B}_1$ can then be plotted in block 165 on the ADA diagrams having the theoretical attributes $\overline{B}_0$ and $B_1$ contour lines produced in Block 180. As a result of this plotting of the scaled observed attributes $\overline{B}_0$ and $B_1$ on the ADA diagrams, a most probable estimate of reservoir formation $F_2$ rock properties can be determined at the intersection of the scaled observed attribute contour lines $\overline{B}_0$ and $\overline{B}_1$ in Block 190. And in fact by line 166, iteration of this sequence is provided for varying the scalar K.

Returning now to the ADA diagrams of FIGS. 7 and 8, three different seismic scalars K have been specified to produce normal incident reflection coefficients $R_c(0°)$ of $-0.05$, $-0.10$ and $-0.20$ for the scaled observed attributes $\overline{B}_0$ and $\overline{B}_1$. Recall that the attribute contour lines on the ADA diagrams of FIGS. 7 and 8 were both derived assuming a given set of roof formation $F_1$ rock properties and a wide range of possible sets of reservoir formation $F_2$ rock properties associated with the selected seismic event. FIGS. 7 and 8 both indicate that the respective values of the scaled observed attributes $\overline{B}_0$ and $\overline{B}1$ for the different values of the scalar K to produce normal incident reflection coefficients $R_c(0°)$ of $-0.05$, $-0.10$ and $-0.20$. The point of intersection of the $\overline{B}_0$ contour line of FIG. 7 and the $B_1$ contour line of FIG. 8 for the scaled observed attributes $\overline{B}_0$ and e,ovs/B/ 1 defines a point which uniquely defines the most probable estimate of the reservoir formation $F_2$ rock properties, $V_p$, $V_s$ and $p(V_p)$ are shown in FIG. 10.

Figure 10:
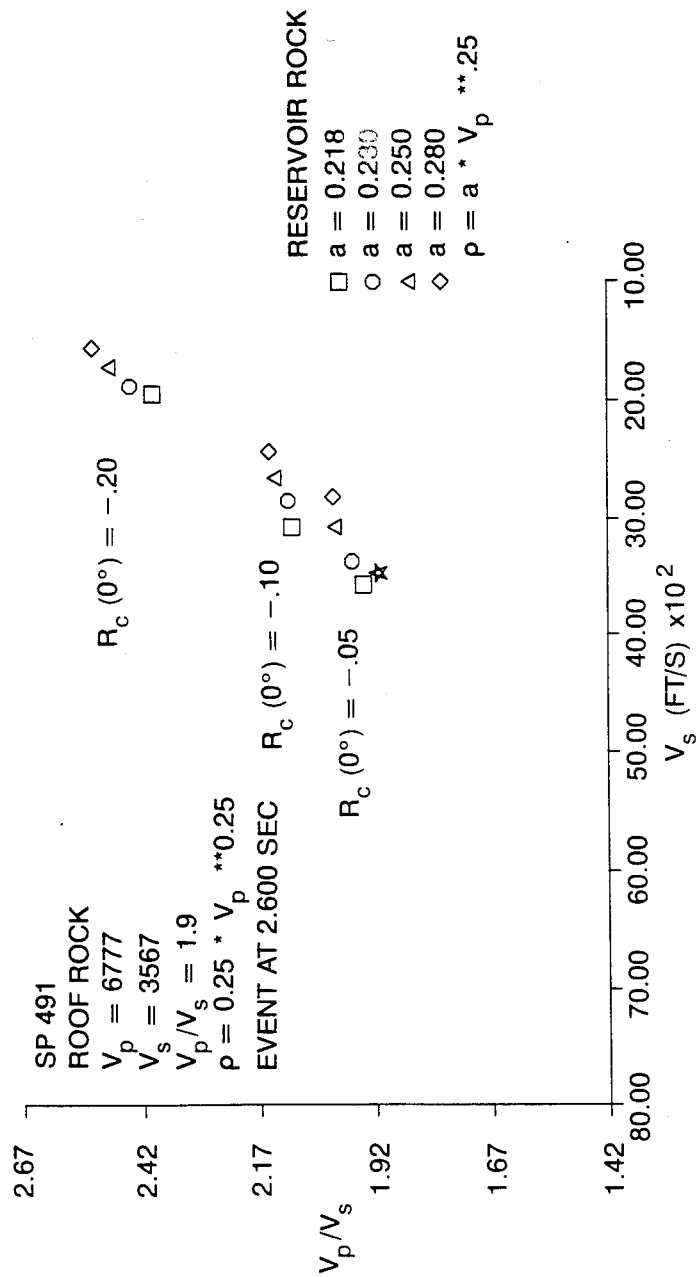
FIG. 10 is an angle dependent amplitude diagram with the relationship of the assumed formation rock properties and the calculated reservoir formation rock properties thereon, for the seismic event at SP 491.

FIG. 10 also shows the point of intersection of the contour lines for the scaled observed attributes $\overline{B}_0$ and $\overline{B}_1$ for variations in the density $\rho$ of formation $F_2$ according to Equation (4) where "a" is 0.218, 0.23 0.250 and 0.280 and the scalar K is chosen to produce a reflection coefficient $R_c(0°)$ of $-0.05$, normal incident reflection coefficient $R_c(0°)$ each value of te normal incident intersection of the contour lines caused by changes in the formation the underlying formation $F_2$ density are represented by a square, a circle, a triangle, and a diamond shape, respectively, in FIG. 10.

Allowing the density $\rho$ of formation $F_2$ to vary within prescribed limits can be seen to have little effect. As such, the user through iterative processing can make determinations of both the observed attributes $B_0'$ and $B_1$, and of the inversion scalars K. The intersection of the scaled observed attributes $\overline{B}_0$ and $\overline{B}_1$ plotted on the theoretical attribute $\overline{B}_0$ and $B_1$ contours defines the most probable estimate of the reservoir formation $F_2$ rock properties ($V_p$, $V_s$, $\rho$ ($V_p$)) for the underlying formation $F_2$ in block 190.

EXAMPLE 2

Returning to FIGS. 1 and 2, the selected seismic event of interest is shown at SP 491 and approximately 2.6 seconds. The results of various trials of reservoir formation $F_2$ rock properties ($V_s$, $V_p$ and $\rho$ ($V_p$)) and the seismic inversion scalar K according to the present invention are shown in Tables 2 and 3. In fact, the FIGS. 7, 8 and 10 are demonstrative of the implementation of the present invention as applies to the seismic event at SP 491 and 2.6 seconds and corresponds to the data shown in Table 2.

TABLE 2

| Reservoir Density Relation to Vp | Reflection Coefficient Rc(θ) | Calculated Reservoir Formation F₂ Properties | | | | Most Likely Result |
|---|---|---|---|---|---|---|
| | | Vp | Vs | Vp/Vs | ρ | |
| a = 0.218 | −0.20 | 5520 | 2300 | 2.40 | 1.88 | |
| | −0.10 | 6510 | 3100 | 2.10 | 1.96 | * |
| | −0.05 | 7020 | 3600 | 1.95 | 2.00 | |
| a = 0.230 | −0.20 | 5268 | 2150 | 2.45 | 1.96 | * |
| | −0.10 | 6119 | 2900 | 2.11 | 2.03 | * |
| | −0.05 | 6698 | 3400 | 1.97 | 2.08 | |
| a = 0.250 | −0.20 | 4875 | 1950 | 2.50 | 2.09 | |
| | −0.10 | 5687 | 2670 | 2.13 | 2.17 | * |
| | −0.05 | 6200 | 3100 | 2.00 | 2.22 | |
| a = 0.280 | −0.20 | 4470 | 1760 | 2.54 | 1.29 | |
| | −0.10 | 5268 | 2450 | 2.15 | 2.39 | * |
| | −0.05 | 5729 | 2850 | 2.01 | 2.44 | |

| Assumed Roof Formation F₁ | Assumed Reservoir Formation F₂ |
|---|---|
| Vp = 6777 | $\rho = a (Vp)^{.25}$ |
| Vs = 3567 | |
| Vp/Vs = 1.9 | |
| $\rho = 2.276 = .25 (Vp)^{.25}$ | |

Figure 3:
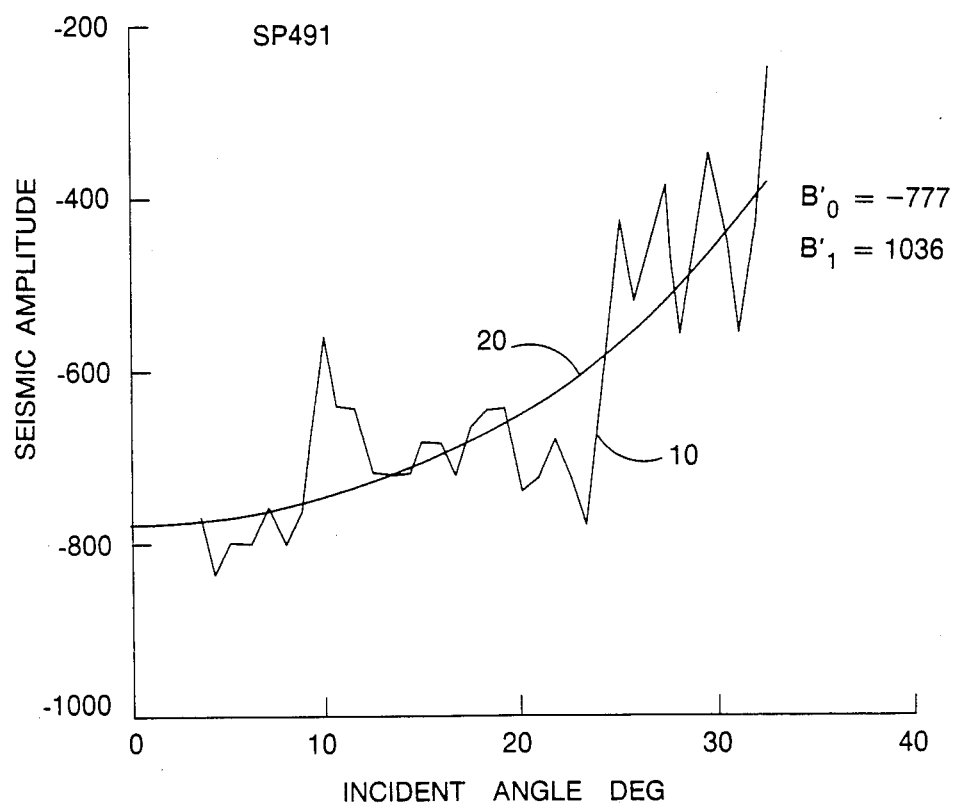
FIG. 3 is a plot of seismic amplitude for the seismic event of FIG. 2 as a function of incident angle.

Within Table 2 the overlying roof formation $F_1$ rock properties are fixed while the potential rock properties of the reservoir formation $F_2$ are allowed to vary to produce sets of theoretical attributes $\overline{B}_0$ and $B_1$ contour lines as shown in FIGS. 7 and 8. The density $\rho$ of the reservoir formation $F_2$ is varied by changing "a" in Equation (3) to values of 0.218, 0.232, 0.250 and 0.280. The scalar K is varied to produce normal incident reflection coefficients $R_c(0°)$ from $-0.05$ to $-0.20$ as seen in FIGS. 7, 8 and 10 and is used to invert the observed attributes $B_0'$ and $B_1'$ derived from a least squares fit of Equation (2) to the amplitude of the field seismic signals as a function of incident angle as shown in FIG. 3.

When higher values of the ratio $V_p/V_s$ are assumed for the roof formation $F_1$, the same relative distribution of intersection points results, but now is upward and to the right from the formation $F_1$ rock properties shown by the star in in FIG. 10. Changes in the density in the roof formation $F_1$ results in a slight rotation of the intersection points, but does not otherwise affect the relative overall distribution of intersection points as seen in Table 3, as noted by looking at the determined reservoir formation $F_2$ rock properties.

TABLE 3

| Reservoir Density Relation to Vp | Reflection Coefficient Rc(θ) | Calculated Reservoir Formation F₂ Properties | | | | Most Likely Result |
|---|---|---|---|---|---|---|
| | | Vp | Vs | Vp/Vs | ρ | |

TABLE 3-continued

| | | | | | |
|---|---|---|---|---|---|
| a = 0.218 | −0.20 | 5515 | 2050 | 2.51 | 1.85 |
| | −0.10 | 6021 | 2820 | 2.14 | 1.92 * |
| | −0.05 | 6476 | 3300 | 1.96 | 1.96 |
| a = 0.230 | −0.20 | 4914 | 1960 | 2.51 | 1.93 |
| | −0.10 | 5790 | 2690 | 2.15 | 2.01 * |
| | −0.05 | 6166 | 3130 | 1.97 | 2.04 |
| a = 0.250 | −0.20 | 4572 | 1840 | 2.49 | 2.06 |
| | −0.10 | 5381 | 2500 | 2.15 | 2.14 * |
| | −0.05 | 5769 | 2910 | 1.98 | 2.18 |
| a = 0.280 | −0.20 | 4161 | 1630 | 2.55 | 2.25 |
| | −0.10 | 4895 | 2230 | 2.20 | 2.34 |
| | −0.05 | 5287 | 2640 | 2.00 | 2.39 |

| Assumed Roof Formation $F_1$ | Reservoir Formation $F_2$ |
|---|---|
| $V_p = 6777$ | $\rho = a(V_p)^{.25}$ |
| $V_s = 3567$ | |
| $V_p/V_s = 1.9$ | |
| $\rho = 2.086 = .23(V_p)^{.25}$ | |

By examining Tables 2 and 3, a seismologist would agree that certain of the possible calculated reservoir formation $F_2$ rock properties can be eliminated since only reasonable reservoir formation $F_2$ rock properties are to be considered. In this case, seismologist would consider that a normal incident reflection coefficient $R_c(0°)$ of −0.05 for the large amplitude event indicated at SP 491 and 2.6 seconds of FIGS. 1 and 2 appears too small, and thus seismologists can eliminate all of those possible rock properties. Likewise, the seismologist can also eliminate as unlikely all calculated reservoir formation $F_2$ rock properties where the compressional velocity $V_p$ is less than 5000 ft/sec or the density $\rho$ is less than 1.9 gm/cc. Similarly, all calculated reservoir formation $F_2$ rock properties for reflection coefficient $R_c$ values of −0.2 can be eliminated except for a calculated reservoir formation $F_2$ density $\rho$ is defined by a =0.23. The remainder of the calculated reservoir formation $F_2$ rock properties are associated with the normal incident reflection coefficient $R_c(0°)$ having a value of about −0.10. As such, a range of the most probable estimate of rock properties associated with the seismic event at SP 491 and 2.6 seconds are shown in Table 4 derived from the ADA diagram in FIG. 10.

TABLE 4

| |
|---|
| $V_p = 5900 \pm 600$ ft/sec |
| $V_s = 2780 \pm 330$ ft/sec |
| $V_p/V_s = 2.12 \pm 0.03$ |
| $\rho = 2.14 \pm 0.20$ gm/cm$^2$ |

Seismologists would generally expect that a decrease in both the compressional velocity $V_p$ and density $\rho$ for the reservoir formation $F_2$, i.e., change of formation rock properties of up and to the right from the assumed reservoir formation rock properties indicated by the star on the ADA diagram of FIG. 10, is consistent with a change to more poorly consolidated rock. Poor consolidation at depths on the order of 8,000 to 10,000 ft (generally corresponding to a two way travel time of 2.6 sec) and deeper is characteristic mainly of rocks that are undercompacted. Undercompaction can be associated with overpressurized zones. Thus, one would expect that the seismic event at SP 491 is indicative of the contrast between a consolidated rock and an overpressurized, undercompacted rock. Moreover, such a conclusion would indicate that this particular seismic event would be a poor candidate for gaseous hydrocarbons because of its high $V_p/V_s$ ratio.

EXAMPLES 3 and 4

Figure 11:
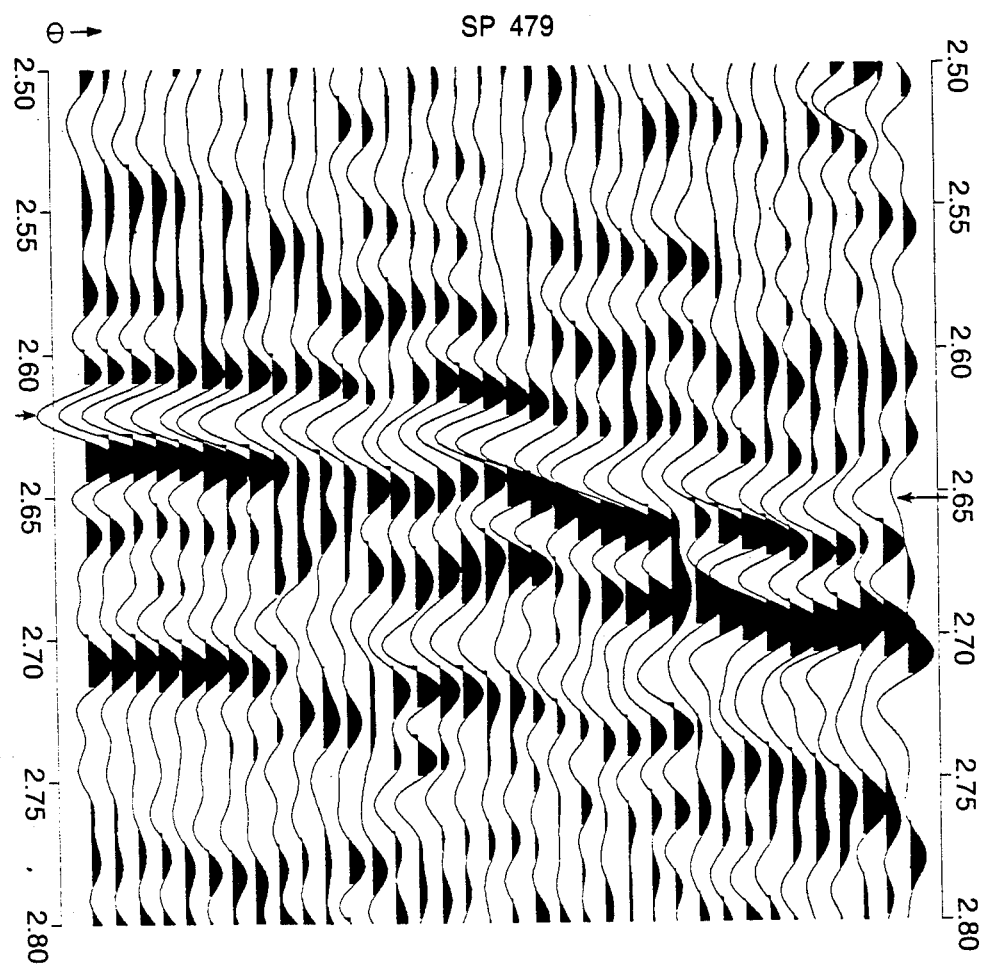
FIG. 11 is an unstacked CDP gather of field seismic signals at SP 479 of FIG. 1.
Figure 12:
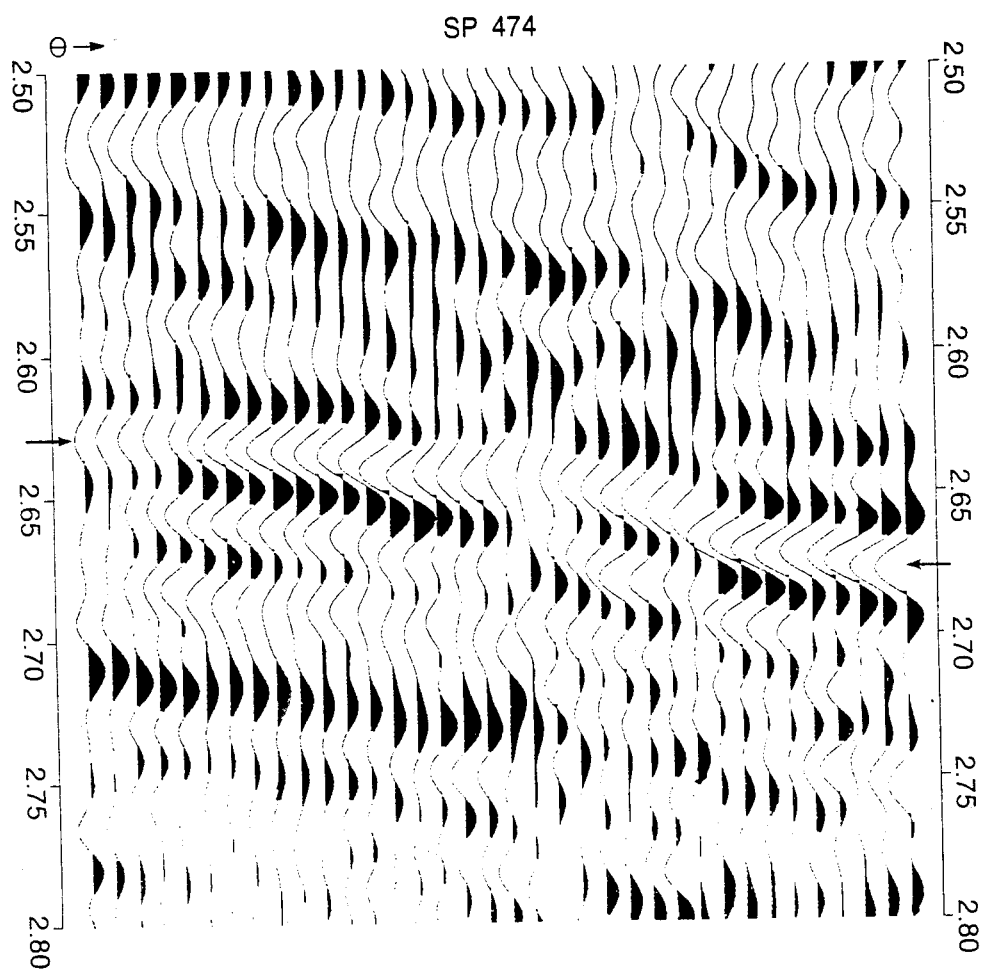
FIG. 12 is an unstacked CDP gather of field seismic signals at SP 474 of FIG. 1.

However, if we now look at additional field seismic signals or traces progressively to the left on FIG. 1, we see in FIGS. 11 and 12 that the character of the seismic event at approximately 2.6 seconds at SP 479 and SP 474 is changing.

Figure 13:
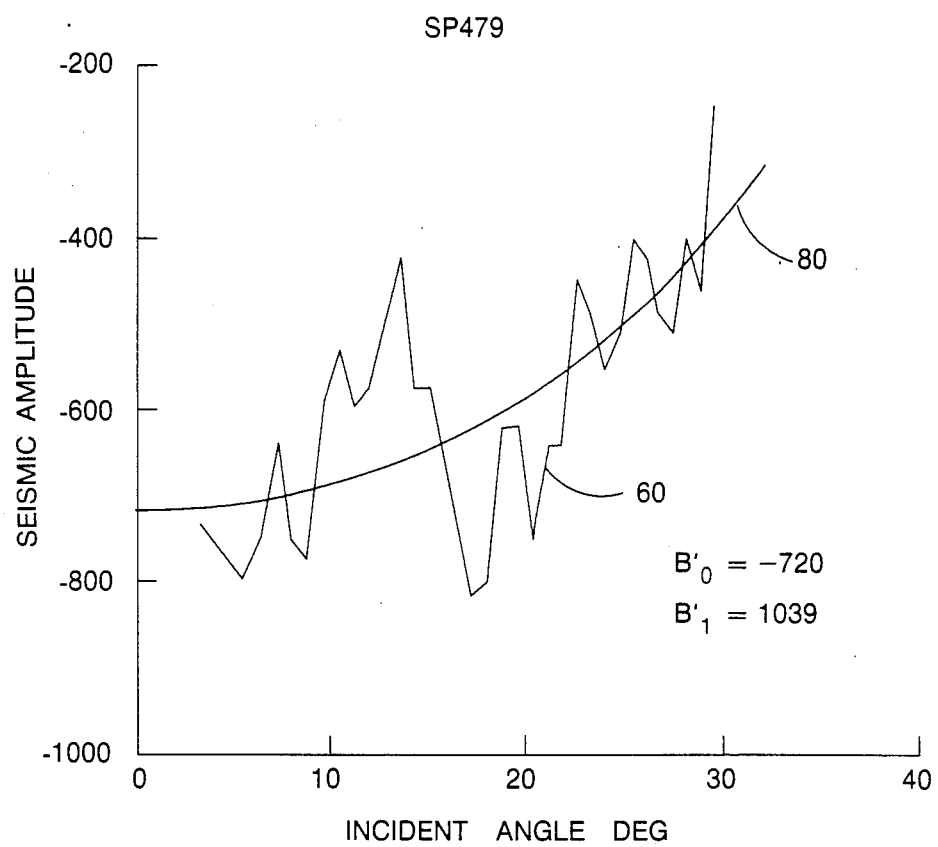
FIG. 13 is a plot of the field seismic signal amplitude for the selected seismic event of FIG. 11 as a function of incident angle and a least squares fit thereto.
Figure 14:
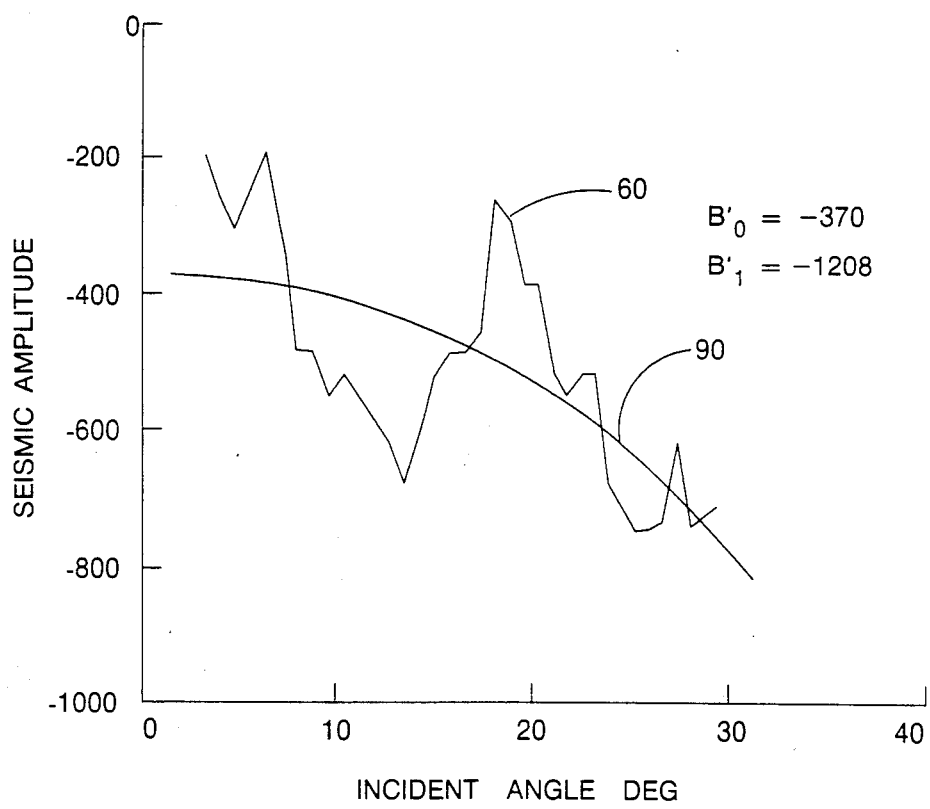
FIG. 14 is a plot of the seismic signal amplitude for the selected seismic event of FIG. 12 as a function of incident angle and a least squares fit thereto.

In FIG. 11 an unstacked CDP gather of field seismic signals is shown. The field seismic signal amplitude for the seismic event indicated by arrows is large and negative at small incident angles (on the left of FIG. 11) and decreases with increasing incident angles (to the right). Looking at FIG. 12; an unstacked gather of field seismic signals at SP 474, the field seismic amplitudes for the seismic event indicated by arrows, while still negative, are smaller than previously, and the field seismic signal amplitude increases with increasing incident angle (to the right). The change in character of the seismic event at 2.6 seconds between SP 474 and 479 is clearly shown in FIGS. 13 and 14 wherein the field seismic signal amplitudes for the selected seismic event of FIGS. 11 and 12 are plotted as a function of incident angle in curves 60 and 70, respectively, and a least squares fit of such seismic data to Equation (2) is plotted in curves 80 and 90 to obtain values for the observed attributes $B_0'$ and $B_1'$. The values of the observed attributes $B_0'$ and $B_1'$ have changed from SP 479 to SP 474 such that the observed attributes $B'_0$ and $B'$ both have the same sign at SP 474. Since the maximum incident angle $\theta$ is less than 35°, the attribute $B_2$ can be disregarded.

Figure 15:
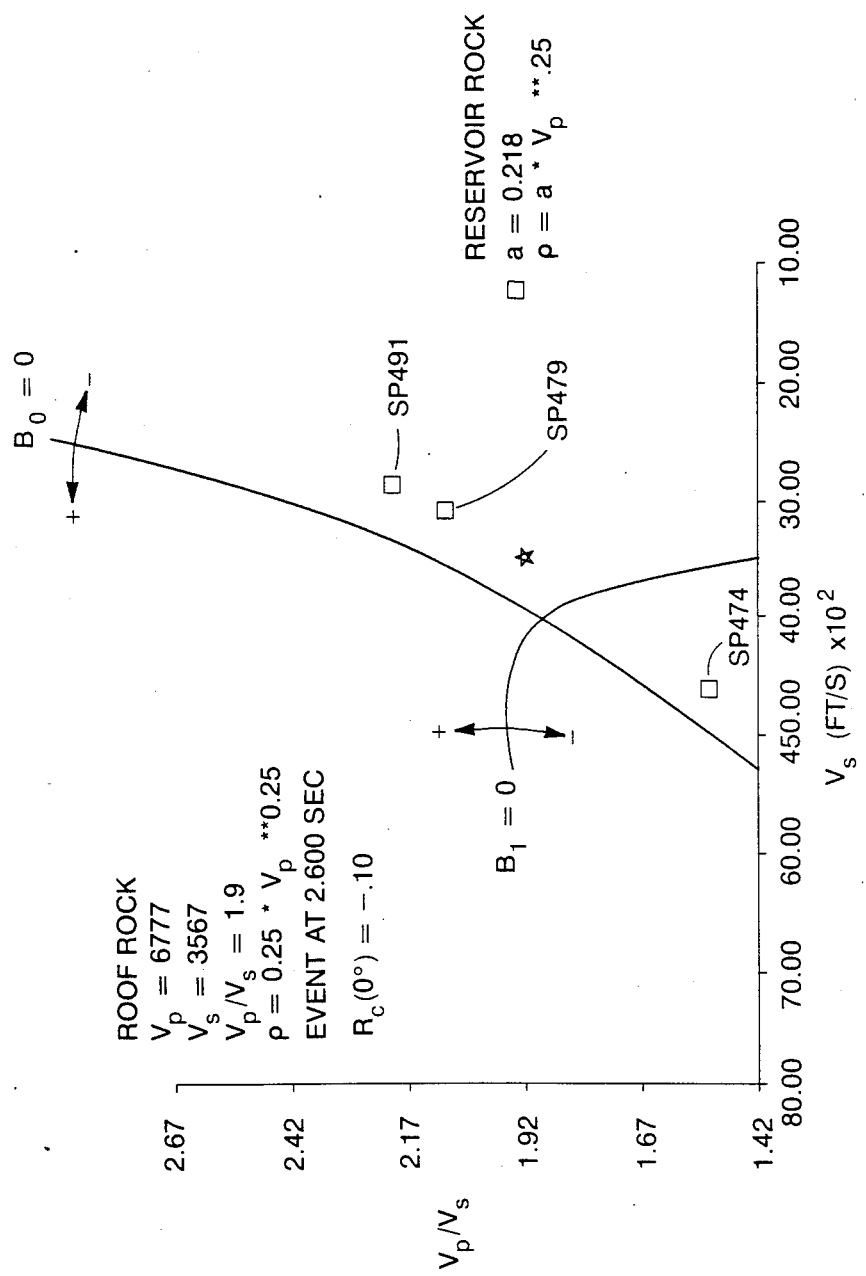
FIG. 15 is an angle dependent amplitude diagram showing the relationship between the assumed overlying roof formation rock properties and the calculated underlying reservoir formation properties for the seismic event at 2.6 seconds about SP 474, SP 479 and SP 491.

The most probable estimate of reservoir formation $F_2$ rock properties for the three different locations (i.e., SP 491, SP 479 and SP 474) are shown on the ADA diagram in FIG. 15. Here the seismic scalar K has been selected so as to produce a normal incident reflection coefficient $R_c(0°)$ of −0.10. It is concluded that the change from roof formation $F_1$ to reservoir formation $F_2$ at SP 474 in FIG. 12 is toward a more consolidated, yet low velocity formation. The most probable calculated reservoir formation $F_2$ rock properties at this location are shown in Table 5.

TABLE 5

| |
|---|
| $V_p = 6450 \pm 600$ ft/sec, |
| $V_s = 4260 \pm 360$ ft/sec, |
| $V_p/V_s = 1.51 \pm 0.01$, and |
| $\rho = 2.19 \pm 0.20$ gm/cm$^2$. |

For this set of reservoir formation $F_2$ rock properties, there is a substantial increase in the shear velocity $V_s$ and possibly density $\rho$ with little change in compressional velocity $V_p$. This, in addition to the low $V_p/V_s$ ratio which is normally associated with accumulated gas, suggests a reservoir formation of harder matrix rock, which is gas saturated. Whereas the seismic data associated with SP 479 appears similar in nature to that of SP 491 previously discussed. The results illustrated in FIG. 15 also reveal that the subtle change in the seismic signal amplitude of FIG. 1 is dramatically demonstrated.

Recalling that the lithology diagram, as shown in FIG. 5, was subdivided into quadrants depending on the signs of the theoretical attributes $\overline{B}_0$ and $B_1$, a high probability of evaluating a seismic event as a gas-bearing formation exists in the quadrants in which the values of the scaled observed attributes $\overline{B}_0$ and $\overline{B}_1$ are of the same sign. In fact, a superposition of the theoretical attributes $B_0$ and $B_1$ zero contour lines on FIG. 15 indicates that only the scaled attributes $\bar{B}_0$ and $\bar{B}_1$ intersections for SP 474 meet this criteria.

An additional attribute BL derived from $B_0$ and $B_1$ indicates when the seismic signal amplitude is changing with range and the relative values of the attributes $B_0$ and $B_1$ where:

$$BL = \text{arc tan}(B_1/B_0).$$

In effect, the attribute $B_L$ indicates the quadrant in which the underlying formation $F_2$ rock properties are located as well as providing an immediate and simple correlation of the underlying formation $F_2$ to a gas bearing formation.

Although only a single selected seismic event has been analyzed to obtain a most probable estimate of the underlying formation rock properties associated with the selected seismic event, those skilled in the art can appreciate that an entire seismic trace can be interpreted sequentially whereby the most probable estimate of underlying formation rock properties become the assumed overlying formation rock properties for the next selected seismic event. Additionally, by so handling adjacent seismic traces, lateral variations in formation rock properties, lithology and pore fluid content can be determined.

Changes may be made in combination and arrangement of steps as heretofore set forth in the specification and shown in the drawings; it being understood that changes may be made in the embodiment disclosed without departing from the spirit and scope of the invention as defined in the following claims.

What is claimed is:

1. A method of geophysical exploration for processing seismic data, including the steps of:
   (a) fitting seismic signal amplitude variations, as a function of incident angle for selected seismic events to:

$$R_c'(\theta) = B_0'B_1' \tan^2\theta + B_2' \sin^2\theta \tan^2\theta$$

where
   $R_c'(\theta)$ is a first reflection coefficient as a function of incident angle;
   $\theta$ is the incident angle; and
   obtaining a first set of attributes $B_0'$, $B_1'$ and $B_2'$ descriptive of the seismic signal amplitude variation; and
   (b) mapping the first set of attributes onto an angle-dependent amplitude diagram and transforming the first set of attributes into a measure of the subterranean formation rock properties associated with each selected seismic event.

2. A method of geophysical exploration for processing seismic data, including the steps of:
   (a) fitting seismic signal amplitude, as a function of incident angle for selected seismic events, to:

$$R_c'(\theta) = B_0' + B_1 \tan^2\theta$$

where
   $R_c'(\theta)$ is the first reflection coefficient as a function of incident angle;
   $\theta$ is the incident angle; and
   obtaining a first set of attributes $B_0'$ and $B_1'$ descriptive of the seismic signal amplitude variation; and
   (b) mapping the first set of attributes onto an angle-dependent amplitude diagram and transforming the first set of attributes into a measure of the subterranean formation rock properties associated with each selected seismic event.

3. A method of geophysical exploration for processing seismic data, including the steps of:
   (a) statistically fitting seismic signal amplitude variations, as a function of incident angle, for selected seismic events to a parametric equation relating contrasts in formation rock properties to seismic signal amplitude variations, as a function of incident angle, and obtaining a set of attributes descriptive of such amplitude variations; and
   (b) mapping the set of attributes onto an angle-dependent amplitude diagram and transforming the set of attributes into a measure of the contrast in subterranean formation rock properties associated with each selected seismic event.

4. The method of claim 3 wherein the angle-dependent amplitude diagram comprises:
   a lithology diagram having axes of selected formation rock properties for relating contrasts in formation lithology to contrast in formation rock property; and
   contour lines representative of assumed contrasts and formation rock properties across subterranean formation interfaces mapped onto the lithology diagram.

5. The method of claim 4 wherein:
   only the zero values of the contour lines representative of an assumed contrast in formation rock properties across subterranean formation interfaces are mapped onto the lithology diagram.

6. A method of geophysical exploration for displaying and interpreting seismic data including the steps of:
   (a) preparing a lithology diagram having axes of selected formation rock properties for relating contrasts in formation lithology to contrasts in formation rock properties;
   (b) plotting contour lines on the lithology diagram representative of contrasts in assumed formation rock properties across a subterranean formation interface; and
   (c) mapping a first set of attributes on the lithology diagram wherein the attributes are descriptive of variations in amplitude of a seismic signal, as a function of incident angle, for a selected seismic event associated with the subterranean formation interface.

7. The method of claim 6 wherein step (a) includes:
   selecting formation rock properties from the group comprising Poisson's ratio, compressional velocity, shear velocity, the ratio of the compressional velocity to shear velocity and density.

8. The method of claim 6 wherein step (b) includes:
   plotting contour lines of a second set of attributes obtained from an optimized statistical fit of an exact reflection coefficient for the assumed contrast in formation rock properties according to:

$$R_c(\theta) = B_0 + B_1 \tan^2\theta + B_2 \sin^2\theta \tan^2\theta$$

where $R_c(\theta)$ is the reflection coefficient as a function of incident angle;
   $\theta$ is the incident angle; and
   $B_0$, $B_1$ and $B_2$ comprise attributes of the second set of attributes.

9. The method of claim 8 wherein the maximum incident angle $\theta$ is less than 35° and $R_c(\theta) = B_0 + B_1$ 10. The method of claim 9 wherein the step (c) includes:

obtaining the first set of attributes by performing an optimized statistical fit of the variations in the amplitude seismic signal according to $$R_c(\theta) = B_0 + B_1 \tan^2\theta + B_2 \sin^2\theta \tan^2\theta$$

where $R_c(\theta)$ is the reflection coefficient as a function of incident angle;

$\theta$ is the incident angle; and $B_0$, $B_1$ and $B_2$ comprise attributes of the first set of attributes.

11. The method of claim 10 wherein the maximum incident angle is less than 35° and $R_c(\theta) = B_0 + B_1 \tan^2\theta$.

12. A method of geophysical exploration for obtaining a measure of subterranean formation rock properties including the steps of:

obtaining a set of observed attributes descriptive of seismic signal amplitude variations as a function of incident angle for seismic events in the seismic signals;

obtaining a set of theoretical attributes descriptive of a plurality of contrasts in assumed formation rock properties across a subterranean formation interface associated with the selected seismic event;

plotting a plurality of theoretical attribute contour lines on a lithology diagram having axes of selected formation rock properties for relating contrasts in formation lithology to contrasts in formation rock properties;

scaling the observed set of attributes to units of reflection coefficient; and plotting the scaled observed attributes onto the contour lines of the theoretical set of attributes to obtain a measure of the underlying formation rock properties associated with the seismic event.

13. The method of claim 12 wherein:

only the zero values of the theoretical attribute contour lines are plotted on the lithology diagram.

14. The method of claim 13 wherein:

the zero values of the theoretical attributes subdivide the lithology diagram into quadrants, selected quadrants being correlated to gas bearing formations.

15. The method of claim 14 wherein:

the quadrants in which the scaled observed attributes having the same sign correlate with gas bearing formations.

16. The method of claim 14 wherein:

locating the quadrant for the observed attributes according to:

$B_L = \text{arc tan } (B_1/B_0)$ where $B_0$ and $B_1$ comprise the observed attributes.

17. A method of geophysical exploration for interpreting seismic data, including the steps of:

(a) obtaining a first set of attributes descriptive of seismic signal amplitude variations as a function of incident angle for selected seismic events in incident angle ordered gathers of seismic signals;

(b) assuming a set of formation rock properties for an overlying formation associated with each selected seismic event;

(c) assuming any other set of formation rock properties for an underlying formation associated with each selected seismic event;

(d) wherein the assumed formation rock properties define a plurality of assumed contrasts in the formation rock properties across the subterranean formation interface associated with each selected seismic event;

(e) obtaining second sets of attributes from the plurality of assumed contrasts in formation rock properties for each selected seismic event;

(f) mapping contour lines of the second sets of attributes onto a lithology diagram; and (g) plotting the first set of attributes onto the respective contour lines of the second set of attributes to obtain a more probable estimate of the underlying formation rock properties.

18. The method of claim 1 or 2 wherein the angle dependent amplitude diagram: comprises:

a lithology diagram relating relative changes in formation rock properties to relative changes in formation lithology; and contour lines mapped on the lithology diagram representative of an assumed contrast in formation rock properties associated with each selected seismic event.

19. The method of claim 18 wherein:

the contour lines are representative of a second reflection coefficient for the assumed contrast in formation rock properties associated with each selected seismic event.

20. The method of claim 18 wherein:

the contour lines are representative of a second set of attributes descriptive of the assumed contrast in formation rock properties associated with each selected seismic event.

21. The method of claim 20 wherein:

the contour lines are representative of an optimized statistical fit to an exact reflection coefficient obtained from the assumed contrast in formation rock properties associated with each selected seismic event according to:

$$R_c(\theta) = B_0 + B_1 \tan^2\theta + B_2 \sin^2\theta \tan^2\theta$$

where $R_c(\theta)$ is the second reflection coefficient as a function of incident angle; is the incident angle; and $B_0$, $B_1$ and $B_2$ comprise the second set of attributes.

22. The method of claim 20 wherein the contour lines are representative of an optimized statistical fit to an exact reflection coefficient obtained from the assumed contrast in formation rock properties associated with each selected seismic event according to:

$$R_c(\theta) = B_0 + B_1 \tan^2\theta$$

where $R_c(\theta)$ is the second reflection coefficient as a function of incident angle;

$\theta$ is the incident angle; and $B_0$, $B_1$ comprise the second set of attributes.

23. The method of claim 22 wherein the maximum incident angle $\theta$ is less than 35°.

24. The method of claim 1 or 2 further including the step of:

determining the most probable estimate of the formation rock properties associated with the selected seismic event, wherein the formation rock properties are selected from the group of shear wave velocity, compressional wave velocity and density.

25. The method of claim 17 further including the step of:

developing an angle dependent amplitude diagram from a plurality of assumed contrasts in the formation rock properties associated with each selected seismic event.

26. The method of claim 25 further including the step of:

mapping the first set of attributes on the angle dependent diagram to determine a most probable estimate of the underlying formation rock properties associated with each selected seismic event.

* * * * *

UNITED STATES PATENT OFFICE
CERTIFICATE OF CORRECTION

PATENT NO. : 4,779,237                                    Page 1 of 2
DATED : October 18, 1988
INVENTOR(S) : John H. Bodine It is certified that error appears in the above-identified patent and that said Letters Patent is hereby corrected as shown below:

Column 4, line 15, "Rc(03)" should read --$R_c(0°)$--;

line 37, delete "ties.";

line 60, "B2" should read --$B_2$--.

Column 5, line 15, "$R_c'(0)$" should read --$R_c'(\theta)$--;

line 15, insert --coefficient-- at the beginning of the line, delete "coefficient" at the end of the line.

Column 7, line 43, "B" should read --$B_1'$--;

line 66, "$B_0$ and $B_1$" should read --$\overline{B}_0$ and $\overline{B}_1$--.

Column 8, line 27, "$F_1$" should read --$F_1$.--.

Column 9, line 23, "$B_1 40$" should read --$B_1'$--;

line 50, "e,ovs/B/$_1$" should read --$\overline{B}_1$--;

line 58, following "to produce a" insert --normal incident--;

line 59, following "-0.05," insert -- -0.10, and -0.20. For each value of the --;

line 60, following "$R_c(0°)$" delete "each value of te normal incident" and insert --, the variations in the--.

Column 11, line 21, "F2" should read --$F_2$--;

line 52, "F2" should read --$F_2$--.

Column 12, line 28, "$B'_0$ and B'" should read --$B_0'$ and $B_1'$--;

line 38, "F2" should read --$F_2$--;

line 63, "$\overline{B}_0$" should read --$B_0$--.

UNITED STATES PATENT OFFICE
CERTIFICATE OF CORRECTION

PATENT NO. : 4,779,237

DATED : October 18, 1988

INVENTOR(S) : John H. Bodine

Page 2 of 2

It is certified that error appears in the above-identified patent and that said Letters Patent is hereby corrected as shown below:

Column 13, line 3, "BL" should read --$B_L$--;

line 8, "BL" should read --$B_L$--;

line 12, "underlYing" should read --underlying--.

line 38, "$R'_c(\theta) = B'_0 \, B'_1$" should read --$R'_c(\theta) = B'_0 + B'_1$--;

line 56, "$B'_0 + B_1$" should read --$B'_0 + B'_1$--.

Column 14, line 68, "$R_c(\theta) = B_0 + B_1$" should read --$R_c(\theta) = B_0 + B_1 \tan^2\theta$--.

Column 15, line 1, "claim 9" should read --claim 6--.

Column 16, line 46, following "incident angle;", first occurrence, insert --$\theta$--.

Signed and Sealed this

Fifth Day of September, 1989

Attest:

DONALD J. QUIGG

Attesting Officer

Commissioner of Patents and Trademarks